US006881520B1

(12) United States Patent
Li

(10) Patent No.: US 6,881,520 B1
(45) Date of Patent: Apr. 19, 2005

(54) ELECTRODE MATERIAL FOR RECHARGEABLE BATTERIES AND PROCESS FOR THE PREPARATION THEREOF

(75) Inventor: Wu Li, Edmonton (CA)

(73) Assignee: N.V. Umicore S.A., Olen (BE)

(*) Notice: Subject to any disclaimer, the term of this patent is extended or adjusted under 35 U.S.C. 154(b) by 0 days.

(21) Appl. No.: 08/663,952

(22) Filed: Jun. 14, 1996

(51) Int. Cl.[7] .............................................. H01M 4/52
(52) U.S. Cl. .............................. 429/231.1; 429/218.1; 429/231.2; 429/231.3; 429/223
(58) Field of Search ...................... 423/594; 429/218, 429/223, 231.1, 231.3, 231.2, 218.1, 222

(56) References Cited

U.S. PATENT DOCUMENTS

| | | | |
|---|---|---|---|
| 4,302,518 A | | 11/1981 | Goodenough et al. ....... 429/104 |
| 4,808,496 A | * | 2/1989 | Hope et al. .................. 429/192 |
| 4,980,080 A | | 12/1990 | Lecerf et al. ............. 252/182.1 |
| 5,264,201 A | | 11/1993 | Veltman et al. .............. 423/594 |
| 5,486,346 A | * | 1/1996 | Fey ............................. 423/594 |
| 5,626,635 A | * | 5/1997 | Yamaura et al. ............ 29/623.5 |

FOREIGN PATENT DOCUMENTS

JP       07-235292    * 9/1995  ............ H01M/4/02

OTHER PUBLICATIONS

Solid–State Redox Reactions of LiCoO$_2$ (R3m) for 4 Volt Secondary Lithium Cells, Tautomu Ohzuku* and Atsushi ueda–J. Electrochem Soc., vol. 141, No. 11 Nov. 1994.
Lithium–Cobalt–Nickel–Oxide Cathode Materials Prepared at 400°c for Rechargeable Lithium Batteries, R.J. Gummow and M.M. Thackeray–Solid State Ionics 53–56 (1992) 681–687 (month unknown).
Synthesis and Characterization of LiAL$_x$Ni¾O$_2$ (R3m) For Lithium–Ion (Shuttlecock) Batteries, Tautomu Ohzuku, Atsushi Ueda, and Masaru Kouguchi Dec., 1995.

* cited by examiner

Primary Examiner—Carol Chaney
(74) Attorney, Agent, or Firm—Arne I. Fors

(57) ABSTRACT

There is provided a series of novel particulate stabilized lithiated compounds which can be utilized as cathodic materials in lithium ion battery cells. Each particle of the material defines an inner lithiated metal oxide core which acts as an intercalation cathode. A lithium ion conductor coating surrounds the core to stabilize the latter and to improve the electrochemical properties of the material.

3 Claims, 5 Drawing Sheets

ELECTRODE MATERIAL FOR RECHARGEABLE BATTERIES AND PROCESS FOR THE PREPARATION THEREOF

FIELD OF THE INVENTION

The present invention relates to a lithiated cathodic material for use in a lithium ion battery system and to a process for the production thereof.

BACKGROUND OF THE INVENTION

Lithium transition metal oxide powders and, in particular, lithium cobaltic dioxide, form key cathodic materials for the positive electrode (cathode) in rechargeable lithium ion electrochemical cells.

Specific physical, morphological and chemical characteristics are required to sustain the transition metal oxide's performance over several hundred sequential charge and discharge cycles demanded during service. Current battery applications for the powder demand high purity, homogeneity, controlled particle size (1 micron to 50 microns) and low surface area (less than 2.0 m$^2$/g).

Selection of the lithiated transition metal oxides, or indeed any cathodic material, is dependant upon the material having a high reversible capacity and conversely a low irreversible capacity, high thermal stability and low cost. Of the three most commonly contemplated compounds, lithium cobaltic dioxide exhibits a high capacity concomitant with a good thermal stability, but it is extremely costly. Lithium nickel dioxide possesses high capacity, with low relative cost but is thermally unstable. Spinel lithium manganese oxide (LiMn$_2$O$_4$) is the most thermally stable of the three, and is relatively inexpensive, but lacks a high capacity.

The literature abounds in examples of novel lithium ion systems and variations on the methods for the preparation thereof. In U.S. Pat. No. 4,302,518 issued to J. B. Goodenough et al., lithium cobalt dioxide is prepared by calcining a pelletized mixture of lithium and cobalt carbonates in air at 900° C. for several hours. The calcining step may be repeated one or more times to ensure complete conversion to the desired product. The resultant lithiated cobalt dioxide is characterized in having a hexagonal structure with lattice constants a=0.282 nm and c=1.408 nm as described by T. Ohzuku et al. (J. Electrochem. Soc. 141, 2972, 1994). Reaction parameters will determine lattice structures. Thus, as disclosed in Solid State Ionics, 53–56, 681 (1992) by R. J. Gummow et al., lithium cobalt dioxide prepared by the reaction of lithium and cobalt carbonates in air at 400° C. for between 2 to 5 days yields a product having a cubic structure having the lattice constant a=0.28297 nm (c/a=4.90).

In U.S. Pat. No. 4,980,080 issued to A. Lecerf et al., there is described a process for the synthesis of Li$_y$Ni$_{2-y}$O$_2$ or LiNi$_{1-x}$Co$_x$O$_2$. A mixture of hydrated lithium hydroxide and nickel and cobalt oxide are heated in air at temperatures ranging between 600° C. to 800° C. A reheating step is then undertaken to complete the solid state reaction.

U.S. Pat. No. 5,264,201 to J. R. Dahn et al. teaches a process for the production of lithium nickel dioxide involving the reaction of nickel oxide or nickel hydroxide, with an excess of lithium hydroxide, and heating the mixture above 600° C. in an atmosphere substantially free of carbon dioxide and with a high partial pressure ratio of oxygen to water.

Furthermore, it has been suggested that solid solutions of LiNi$_{1-x}$Co$_x$O$_2$ and LiNi$_{1-x}$Al$_x$O$_2$ be used in rechargeable lithium battery applications. The article by T. Ohzuku et al., J. Electrochem. Soc. 142, 4033 (1995) states that LiNi$_{3/4}$Al$_{1/4}$O$_2$ can be made by reacting lithium nitrate, nickel carbonate and aluminium hydroxide at 750° C. under an oxygen atmosphere for 20 hours. Advantageously, the solid state reaction product exhibits a higher stability than lithium nickel dioxide per se but deleteriously has a lower rechargeable capacity. The minimum cobalt content in the LiNi$_{1-x}$Co$_x$O$_2$ compound required to improve stability is significant, and thus is expensive.

Lithium transition metal oxides presently used in rechargeable lithium batteries can exhibit one of two common problems namely, poor thermal stability, or a high fade rate, particularly when cycling at a reversible capacity above about 150 mAh/g. There is a preference for lithium cathode materials that demonstrate good stability when cycling at a reversible capacity of about 200 mAh/g at an average discharge voltage above 3.0 volts.

Thus all manufacturers of lithium ion battery systems attempt to attain the highest reversible capacity commensurate with safe operation. Battery design must take into account the potential dangers of fire or explosion caused by oxygen release from the lithium transition metal oxide within the battery, particularly at the time of its highest charge. Damaging reactions can occur due to increases in temperature when the cell is shorted out or misused.

SUMMARY OF THE INVENTION

It is a primary object of the present invention to provide a thermally, electrochemically and morphologically, stabilized lithiated cathodic material for use in lithium ion battery systems which is particularly functional during cycling at a high reversible capacity.

It is a further object of the invention to provide a series of novel lithiated cathodic compounds, which remain stabilized when delithiated, having improved electrochemical properties.

In accordance with the present invention, there is provided a particulate electrode material wherein each discrete particle comprises an alkali metal-transition metal oxide, or alkali metal-mixed transition metal oxide core. Preferably, the alkali metal-transition metal oxide, or alkali metal-mixed transition metal oxide is a lithiated transition metal oxide, or mixed transition metal oxide, functional as an intercalation cathode. The core has an alkali metal ion conductor in external contact therewith, said conductor having electron conductive properties and being functional to stabilize said core and thereby impart predetermined electrochemical properties to said electrode material. Preferably, the conductor is a lithium ion conductor and the electrode material is cathodic material.

The alkali metal-transition metal oxides forming said core would comprise suitable compounds wherein the transition metal is selected from metals of Groups IIIb, IVB, VB, VIIB, VIIB, and VIII of the Periodic Table. Preferably, the alkali metal-transition metal oxides would be lithiated transition metal oxides. Preferred transition metals would be cobalt, nickel, manganese, chromium, vanadium, titanium or iron, or mixtures thereof. The most preferred core compositions would comprise lithium nickel dioxide, or a lithium nickel cobalt dioxide having the formula LiNi$_{1-y}$Co$_y$O$_2$ wherein y>0, or a mixture thereof.

The alkali metal ion conductor may be considered, without being bound by same, to be either a coating or a surface treatment on, or of, the core. Such a conductor would be preferably selected to closely match the core lattice morphology. The alkali metal-ion conductor, preferably a lithium ion conductor, would be an alkali metal-metal oxide or an alkali metal-mixed metal oxide. The metal or metals may be selected from Groups IIIb, IVB, VB, VIIB, VIIB, and VIII of the Periodic Table. Preferably, the metal would be cobalt, nickel, manganese, chromium, vanadium, titanium, aluminium, or boron, or mixtures thereof. More preferably, the conductor would be selected from lithium cobalt dioxide ($LiCoO_2$), lithium cobalt nickel oxide having the formula $LiCo_xNi_{1-x}O_2$, lithium aluminium dioxide ($LiAlO_2$) or lithium aluminium nickel oxide ($LiAl_xNi_{1-x}O_2$). In its most preferred embodiment, the conductor: would be selected from lithium cobalt dioxide ($LiCoO_2$) or lithium cobalt nickel oxide having the formula $LiCo_xNi_{1-x}O_2$. It is to be noted that the value of x for cobalt and for aluminium in the conductor is greater than y for cobalt and for aluminum in the core, that is to say that the active component is greater on the surface of the material than in the core. Stated otherwise, the surface is cobalt-rich, or aluminium-rich or richer in the active component considered to be effecting stabilization as opposed to the core. The most preferred stabilizing active component or element is considered to be cobalt.

The underlying theoretical basis upon which the present invention is founded resides in ensuring that a controlled level of lithium ions are maintained upon the surface of the material, the level of lithium being replenished from the core. By the provision of a lithium rich surface, the stability of the whole system is maintained.

The invention extends to a process for the preparation of a particulate cathodic material for use in a rechargeable lithium electrochemical cell wherein each particle comprises a lithiated transition metal oxide core functional as an intercalation cathode and a lithium ion conductor in contact with said core, said conductor having electron conductive properties and being functional to stabilize said core to thereby impart predetermined electrochemical properties to said cathodic material which comprises:

provides a core material of $LiNiO_2$ or $LiNi_{1-y}Co_yO_2$ wherein y>0, or mixtures thereof;

admixing an aqueous solution containing a metal compound selected from cobalt nitrate, nickel nitrate or aluminum nitrate, or mixtures thereof, with said core material, lithium containing salts, exemplary of which are lithium nitrate, lithium carbonate or lithium hydroxide being added if necessary to augment or replace the lithium source provided by the core; and heating the reactants at a temperature effective to form the lithium ion conductor on said core and to produce said stabilized cathodic material, preferably at a temperature in the range of 300 to 1000° C. and more preferably at a temperature in the range of 600 to 900° C.

In a second aspect there is provided a process for the preparation of a particulate cathodic material for use in a rechargeable lithium electrochemical cell wherein each particle comprises a lithiated transition metal oxide core functional as an intercalation cathode and a lithium ion conductor in contact with said core, said conductor having electron conductive properties and being functional to stabilize said core to thereby impart predetermined electrochemical properties to said cathodic material which comprises:

providing a core material of $LiNiO_2$ or $LiNi_{1-y}Co_yO_2$ wherein y>0, or mixtures thereof;

coating said core with an aqueous solution containing lithium nitrate, lithium carbonate or lithium hydroxide or mixtures thereof and a metal compound selected from cobalt oxide or cobalt hydroxide in admixture; and heating the reactants at a temperature functional to form the lithium ion conductor on said core and to produce said stabilized cathodic material.

BRIEF DESCRIPTION OF THE DRAWINGS

The present invention will be better understood with reference to the detailed description and examples below and to the accompanying drawings, in which.

DESCRIPTION OF THE PREFERRED EMBODIMENT

Figure 1:
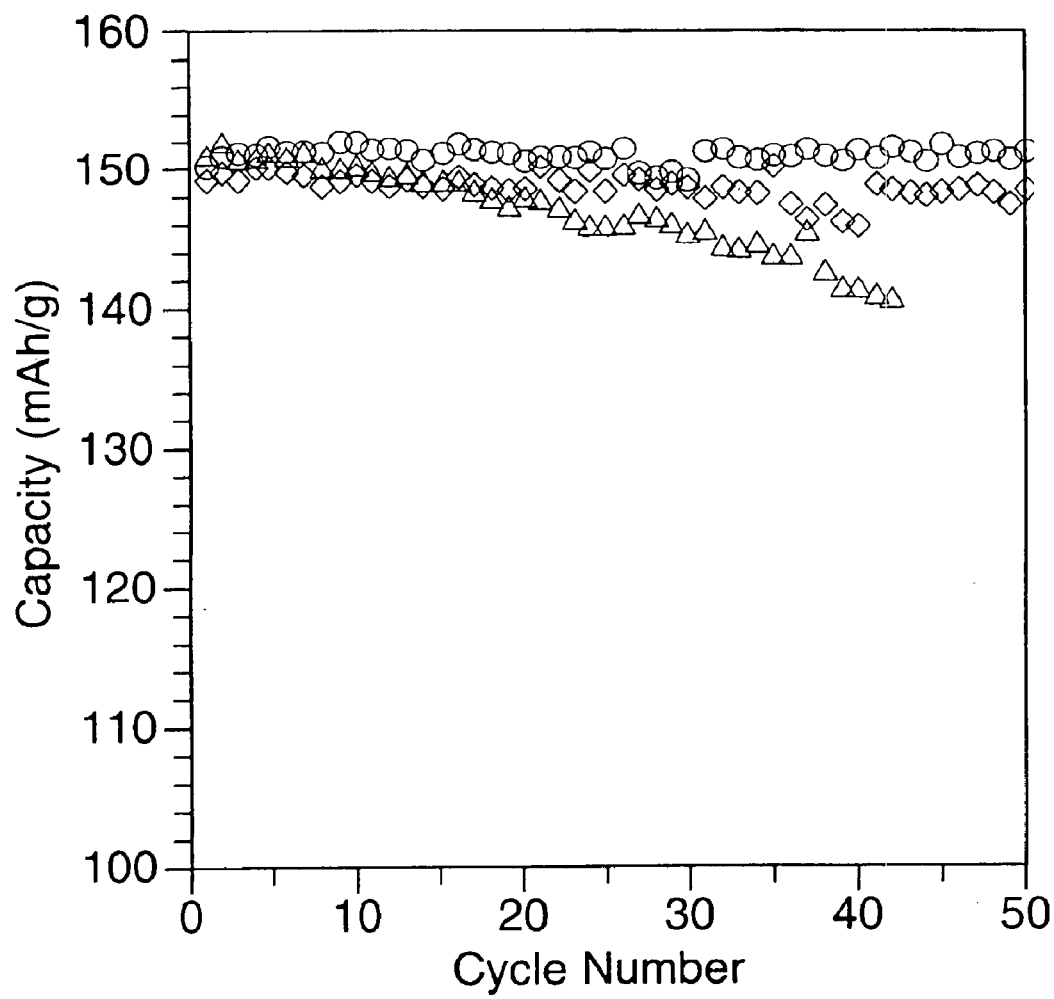
FIG. 1 is a plot of capacity (mAh/g) for three lithiated transition metal compounds, namely uncoated lithium nickel dioxide and two lithium nickel dioxide compounds coated in accordance with the process of the present invention versus cycle number wherein the initial cycle capacity is about 150 mAh/g.

Having reference to the accompanying figures, the stabilized lithiated cathodic material and the process for the preparation thereof will now be described. Whilst the preferred embodiment is described in terms of lithiated cathodic materials, it is to be understood that the invention is not limited thereto and may extend to alkali metal electrode materials in general.

The particulate cathodic material broadly comprises a lithiated metal oxide or lithium mixed metal oxide which is a lithium intercalation compound functional as a cathode-active material. The core has been surface treated, or coated, by a lithium ion conductive compound which stabilizes the core, thereby improving the electrochemical performance of the cell.

Coating may broadly be construed as a physical treatment such as the application of a shell encapsulating the core and/or a surface treatment. Surface treatment is to be understood to involve a chemical reaction such as ion implantation, molecular interdiffusion or the like. Whilst the exact reaction mechanism and structures are at present unknown, surface treatment and/or coating of the core, observable by enhanced electrochemical properties, is known to have taken place. By stabilize is meant all of, or either of morphologically, electrochemically or thermally stabilizing the electrode material. It is important to ensure that sufficient 'active' component be present to ensure stabilization for the particular surface requirements. By 'active' is typically meant cobalt or aluminium or the like. This may be effected by inhibiting the reaction between the cell electrolyte and the electrode material or by decreasing the release of oxygen within the cell at the highly charged state. This may also be effected by inhibiting the reaction between the electrode material and air when the electrode material is exposed to air before use in a cell.

The core material may be selected from suitable alkali metal-metal oxides or alkali metal mixed metal oxides, preferably lithiated metal oxides or lithiated mixed metal oxides, having a particle size ranging between 1 to 50 microns. The metal or metals may be selected from the metals of Groups IIIb, IVB, VB, VIIB, VIIB and VIII of the Periodic Table. Preferably, such metals would be cobalt, nickel, manganese, chromium, vanadium, titanium or iron, or mixtures thereof. Elemental aluminum and/or boron may additionally be added to the core to improve the properties thereof. The most preferred core compositions would comprise lithium nickel dioxide, or a lithium nickel cobalt dioxide having the formula $LiNi_{1-y}Co_yO_2$ wherein y>0, or a mixture thereof. For example when utilizing lithium nickel dioxide as the core, a preferred core material would be like that disclosed in our pending U.S. application Ser. No. 08/510,421, the disclosure of which is incorporated herein by reference.

The lithium ion conductor would be a suitable thermally and electrochemically stable coating functional to stabilize the core when delithiated. The key properties demanded in a conductor are high lithium ion conductivity and a predetermined electron conductivity. Such a conductor preferably would be selected to closely match the core lattice morphology. The conductor would comprise a lithiated metal oxide or lithiated mixed metal oxide. Such metal or metals may be selected from metals of the Groups IIIb, IVB, VB, VIIB, VIIB and VIII of the Periodic Table. Preferably, such metals would be cobalt, nickel, manganese, chromium, vanadium, titanium, aluminium, boron or iron, or mixtures thereof. Most preferably, the conductor would be selected from lithium cobalt dioxide ($LiCoO_2$), lithium cobalt nickel oxide having the formula $LiCo_xNi_{1-x}O_2$, lithium aluminum dioxide ($LiAlO_2$) and lithium aluminium nickel oxide ($LiAl_xNi_{1-x}O_2$). In its most preferred embodiment, the conductor would be lithium cobalt dioxide ($LiCoO_2$) or lithium cobalt nickel oxide having the formula $LiCo_xNi_{1-x}O_2$ wherein x>0, and x>y.

It is to be noted that one or more coatings of the conductor may be applied. Furthermore, the coating thickness may range from very thin at the monomolecular level, up to the micron level. Thickness selection, evident to one skilled in the art, will depend upon the respective compositions of the core and conductor, the electrochemical properties desired, and safety and cost considerations.

For example, if the cobalt content on the surface is 0.3% of the total nickel content and the particle size of the core is about 10 µm, the thickness of the lithium ion conductor is in the order of 10 nm. If the same amount of cobalt content is on the surface, but the particle size of the core is about 1 µm, the thickness of the lithium ion conductor is in the order of 1 nm. Since the lattice constants of lithium nickel dioxide and lithium nickel cobalt dioxide are in the order of 0.5 nm, one lattice unit thickness is in the order of 0.5 nm. The change in the chemical content in the layer of the first lattice unit in the surface means that the surface properties are changed. Therefore, the thickness of lithium ion conductor can be as thin as one layer of lattice unit, or about 0.5 nm. On the other hand, the volume of the lithium ion conductor will be substantially less than the volume of the core, so if the particle size of the core is about 50 µm, the lithium ion conductor thickness can be about 5 µm (5000 nm).

The thermal stability and the electrochemical properties of the solid solution $LiNi_{1-x}Co_xO_2$ is dependent on x, or the cobalt content. If x is changed by 0.1, or even less, the change of electrochemical properties can be measured. The change of thermal stability of $LiNi_{1-x}Co_xO_2$ can be easily measured when x is changed 0.1, or for even less than 0.1. Therefore, if the cobalt content in the surface is enriched by increasing x for 0.1 or less in $LiNi_{1-x}Co_xO_2$, a more stabilized surface can be formed and stabilization of the core can be attained.

Several coating technologies may be utilized whereby a lithium ion conductor is coated onto a lithium intercalation compound. The lithium ion conductor can be manufactured prior to its use as a coating, or alternatively, formed in-situ.

One embodiment of the coating process involves providing a stoichiometric amount of a cobalt salt and the selected lithium salt which react to form the desired coating compound. These compounds are dissolved in water and blended with the core material to form a slurry. (In some instances, there is no necessity to provide a lithium salt for the reaction, there being suffient present in the core for the reaction to proceed successfully). The slurry is then allowed to dry in an oven at approximately 150° C. to thereby coat the core particles. The coated particles are then reacted in a furnace at 750° C. for two hours, optionally in a stream of oxygen, to form the desired coating. Following furnace treatment the material is deagglomerated and screened.

An alternative process involves the use of an insoluble cobalt compound such as cobalt oxide or cobalt hydroxide in combination with a lithium-containing solution which decomposed into lithium oxide under reaction conditions to first coat the core, and are then reacted in-situ to form the desired coating.

EXAMPLE 1

Figure 4A:
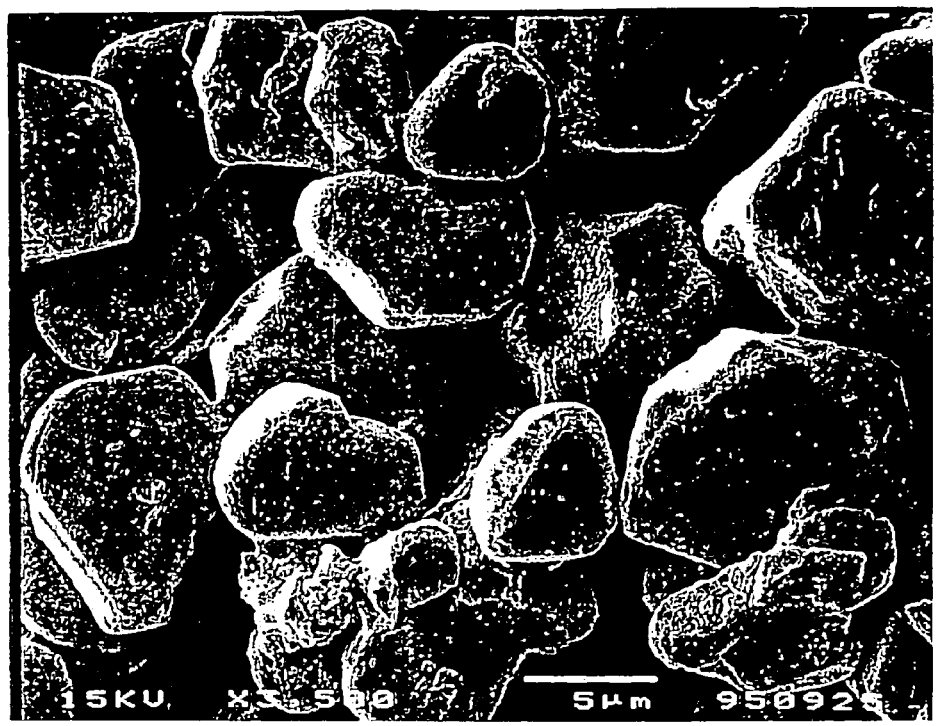
FIGS. 4a and 4b are photomicrographs taken at 3500× magnification of uncoated and coated lithium nickel dioxide respectively.

Uncoated lithium nickel dioxide (termed sample 1) was prepared in accordance with the following method. 463.5 g of $Ni(OH)_2$, 230.7 g of $LiOH.H_2O$ and 35.1 g of KOH (containing about 15% water therein) were admixed using a mortar and pestle, providing an atomic ratio of Ni:Li:K of 1.0:1.1:0.11. The mixture was then heated at 750° C. for 2 hours in a stream of oxygen. After heating, the material was washed with water to remove KOH and excess LiOH, and placed in an oven at 150° C. for 4 hours to remove the water. The material was ground and passed through a 400 mesh screen (Tyler Series) to provide $LiNiO_2$ powder having a particle size of about 10 microns as measured by Microtrac™. The SEM results demonstrate that the particles of approximately 10 microns size were crystalline as shown in FIG. 4a.

EXAMPLE 2

Figure 4B:
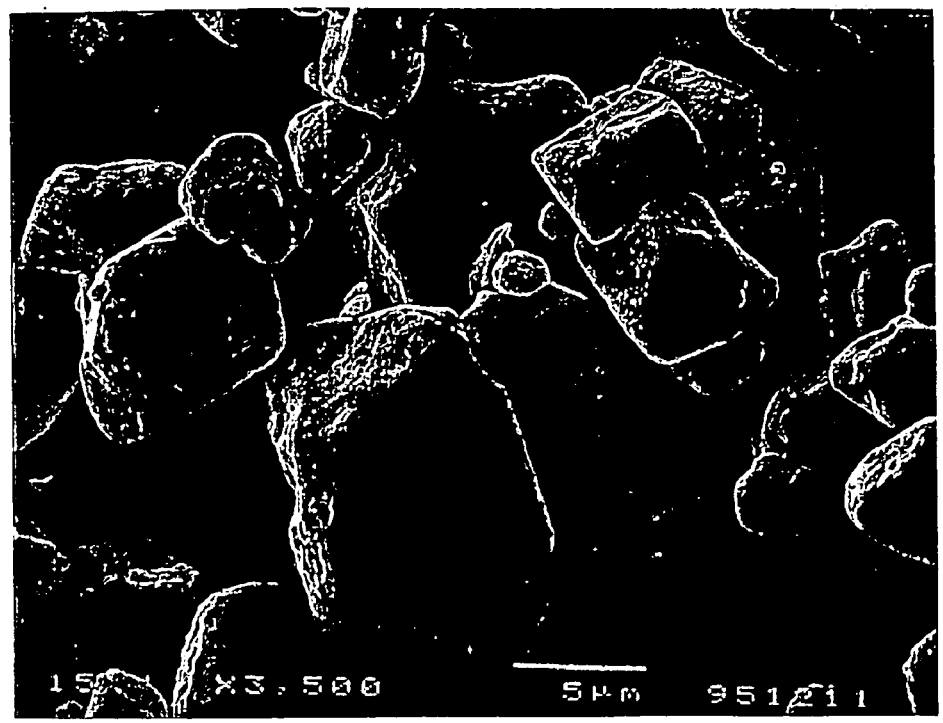

A first coated lithium nickel dioxide compound, (referred to hereinafter as sample 2), was prepared using the following procedure. 25 g of $LiNiO_2$ (sample 1) was mixed with a water solution containing 2.5 g of $Co(NO_3)_{2}0.6H_2O$ and 0.825 g of $LiNO_3$ to form a slurry having a mole ratio of $LiNiO_2:Co(NO_3)_2.6H_2O:LiNO_3$ of 1.0:0.033:0.046. The slurry was stirred and heated to about 120° to remove water. The material was then placed in a furnace and heated at 750° C. for 2 hours in a stream of oxygen. Following the heat treatment step, the material was ground and passed through a 400 mesh screen. SEM observations showed that there were no major differences in particle size between samples 1 and 2 (Compare FIGS. 4a and 4b). However, surface modification of the particles was observed. Approximately 3.3% cobalt content by weight versus total nickel content was thought to be present on the surface. The conventional layered LiCoO$_2$ (a=0.2814 nm, c=1.408 nm) was not observed by X-ray diffraction. Furthermore, surface analysis indicated a higher cobalt content present on the surface of the lithium nickel dioxide particles than in the bulk.

EXAMPLE 3

A second coated lithium nickel dioxide (sample 3) was prepared using the procedures outlined in example 2. 25 g of sample 1 were mixed with a water solution containing 0.25 g of Co(NO$_3$)$_{20.6}$H$_2$O to prepare a slurry having a LiNiO$_2$:Co(NO$_3$)$_2$.6H$_2$O ratio of 1.0:0.0033. As with sample 2, surface modification was effected. The surface cobalt content was thought to be approximately 0.33% (mole ratio).

EXAMPLE 4

An electrochemical cell having a cathode, a separator, an anode and an electrolyte was manufactured. Conventional 2325 coin cell hardware was used with a spacer and a spring to thereby provide the correct stack pressure. The cathode was made by admixing 90% by weight of the lithium transition metal oxide being tested with 9% by weight Super S carbon black and 1% by weight ethylene propylene diene terpolymer in cyclohexane. The slurry was then spread onto aluminium foil before being allowed to dry. The cathode paste coverage was typically 0.20 mg/cm$^2$ and the cathode area was 1.25 cm$^2$. The electrolyte was 1M LiBF$_4$ in propylene carbonate, ethylene carbonate and dimethyl carbonate (25:25:50). Lithium metal was used as the anode and Celgard™ 3500 was used as a separator. The charge current was adjusted to correspond to x=0.5 Li deintercalated in LiNiO$_2$ in 20 hours and the discharge current was adjusted to correspond to x=0.5 Li intercalated in Li$_{1-x}$NiO$_2$ in 10 hours.

EXAMPLE 5

This example is provided to illustrate the comparative charge capacity versus cycle life for samples 1, 2 and 3 respectively. The cells as described in example 4 were charged to 4.15 volts and discharged to 3.0 volts at the current density mentioned supra. The initial capacities for the three samples were all about 150 mAh/g. The results are shown in FIG. 1 wherein the triangular data point represents the cycle performance of sample 1; the circular data point represents the cycle performance of sample 2; and the diamond data point represents the cycle performance of sample 3.

EXAMPLE 6

Figure 2:
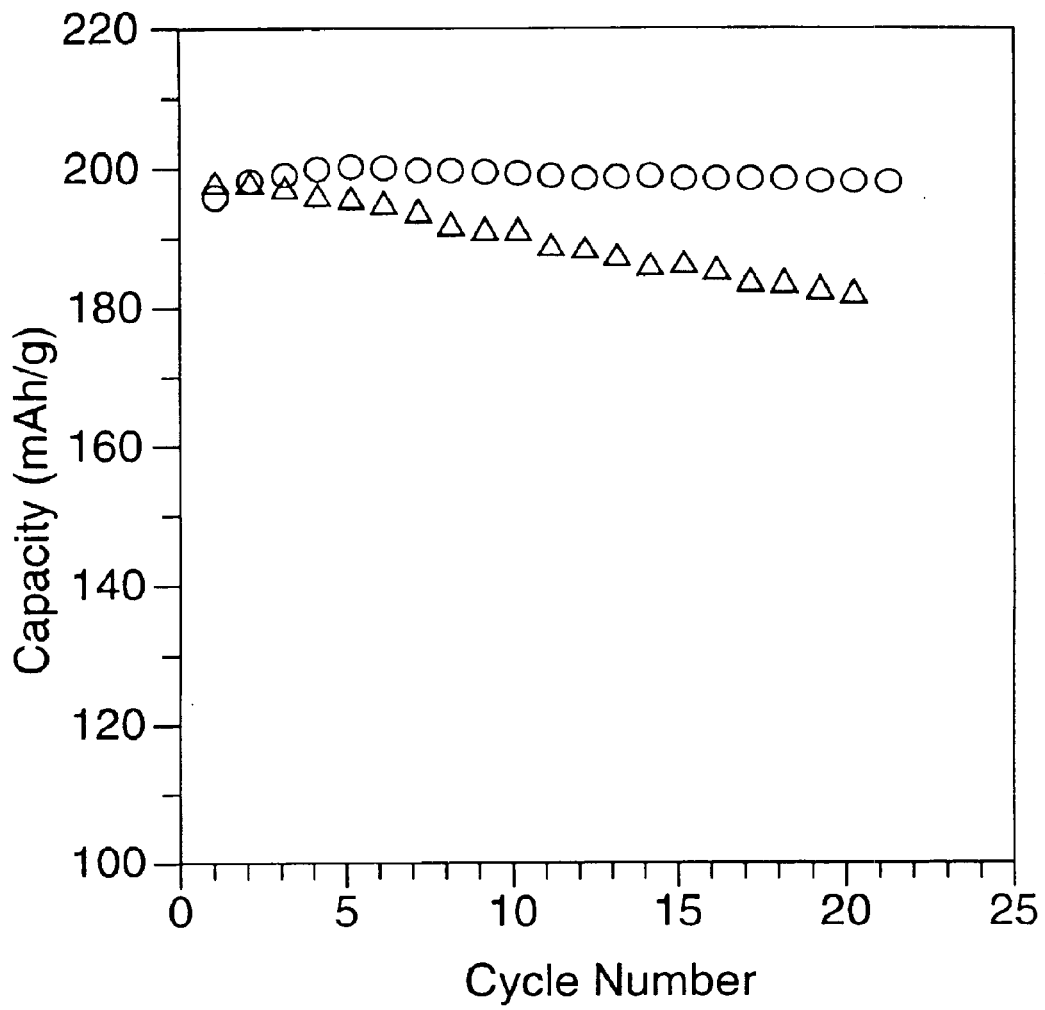
FIG. 2 is a plot of capacity (mAh/g) for two lithiated transition metal compounds, namely uncoated lithium nickel dioxide and a lithium nickel dioxide compound coated in accordance with the process of the present invention versus cycle number wherein the initial cycle capacity is about 200 mAh/g.

This example is provided to illustrate the comparative capacity versus cycle life for samples 1 and 2 respectively. The cells, as described in example 4, were charged to 4.25 volts and discharged to 3.0 volts at the current density mentioned supra. The initial capacities for the two samples were all about 200 mAh/g. The results are shown in FIG. 2 where again the triangular data point represents the cycle performance of sample 1 and the circular data point represents the cycle performance of sample 2.

EXAMPLE 7

Samples 1 and 2 were heated above 900° C. in the absence of oxygen partial pressure. Sample 2 thermally decomposed at about 800° C., whereas sample 1 decomposed at about 780–790° C., thus indicating the improved thermal stability of sample 2 over sample 1.

EXAMPLE 8

Figure 3A:
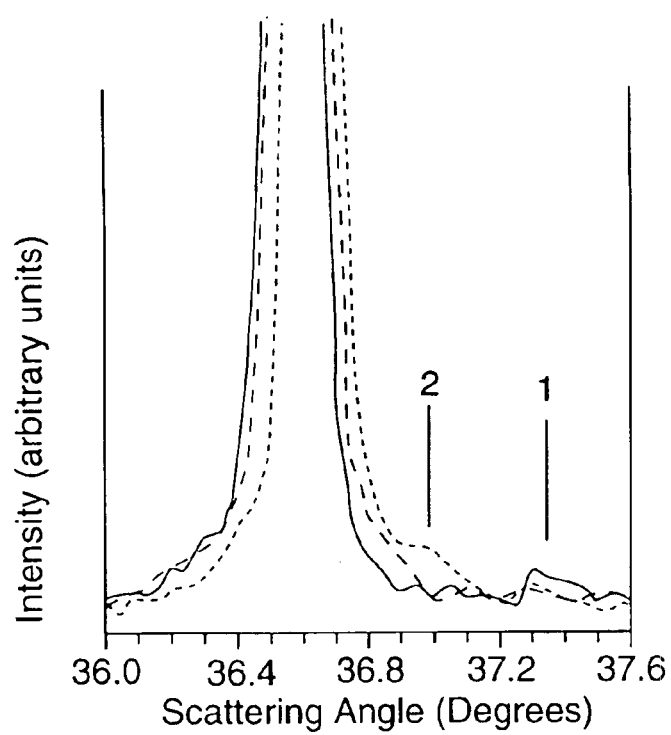
FIG. 3 depicts the X-ray diffraction pattern for an uncoated lithium nickel dioxide, a physical mixture of lithium nickel dioxide and lithium cobalt dioxide and a lithium nickel dioxide surface treated in accordance with the present invention.
Figure 3B:
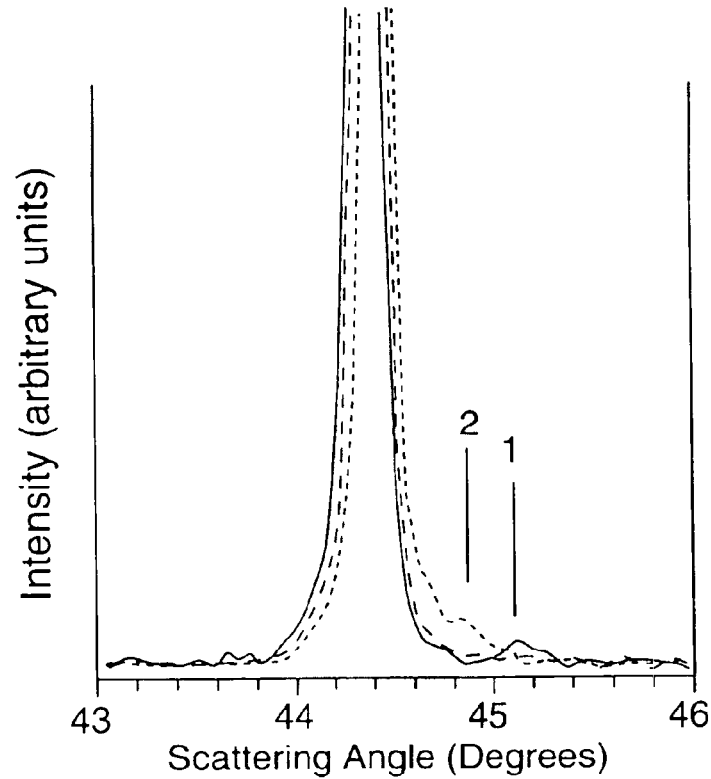

This example depicts the X-ray diffraction patterns of samples 1 and 2 and of a physical mixture of lithium nickel dioxide and lithium cobalt dioxide having a mole ratio of LiNiO$_2$:LiCoO$_2$=1.00:0.033. Sample 1 is depicted by the long dash lines, sample 2 by the short dash lines and the physical mixture by the solid lines in FIGS. 3a and 3b. All the peak intensities were plotted on the same scale for comparative purposes. FIG. 3a shows the region of the (101) peak for LiNiO$_2$ and for LiCoO$_2$ and FIG. 3b shows the region of the (104) peak for the same compounds. Clearly, the results confirm the existence in sample 2 of the presence of a LiNi$_{1-x}$Co$_x$O$_2$ (x>0) phase, denoted by 2 on the figure, whereas lithium cobalt dioxide is denoted by 1. The strongest peak is that of lithium nickel dioxide.

EXAMPLE 9

This example is provided to illustrate that the chemical content of the coating can be controlled as desired. 25 g of sample 1 were mixed with an aqueous solution containing 1.25 g of Ni(NO$_3$)$_{20.6}$H$_2$O, 1.25 g of Co(NO$_3$)$_{20.6}$H$_2$O and 0.825 g of LiNO$_3$ to form a slurry having a mole ratio of LiNiO$_2$:Co(NO$_3$)$_2$.6H$_2$O:Ni(NO$_3$)$_2$.6H$_2$O:LiNO$_3$ of 1.0:0.016:0.016:0.046. The slurry was treated as in example 2. The surface of the particles was found to have changed indicating that the formation of LiNi$_{1-x}$Co$_x$O$_2$ had taken place on the surface of the LiNio$_2$. By selection of the reactant concentrations, it is possible to control the value of x and, as a result, the amount of cobalt on the surface.

EXAMPLE 10

This example is included to show that the cobalt content in the surface of LiNiO$_2$ reduces the fade rate, and further demonstrates that cobalt oxide and lithium hydroxide can be used as a starting material to make a LiNi$_{1-x}$Co$_x$O$_2$ coating on the surface of LiNiO$_2$ particles.

25 g of sample 1 were admixed with 1.21 g cobalt oxide (CO$_2$O$_3$xH$_2$O having a cobalt content of 62.5%) and 0.537 g of LiOH.H$_2$O with some water to form a slurry having a mole ratio of LiNio$_2$:Co:LiOH.H$_2$O of 1.0:0.05:0.05. The mixture was then treated as in example 2. X-ray diffraction showed the existence of two observable phases, namely a major LiNiO$_2$ phase and the other a minor LiCoO$_2$ phase. The formed sample was tested as a cathodic material in the electrochemical cell described in example 4. At an initial capacity of the sample cycling between 4.25 volts and 3.0 volts of close to about 200 mAh/g, the fade rate was found to be lower than that of uncoated lithium nickel dioxide. SEM observations show the existence of three particle types, a first crystalline type similar to the lithium nickel dioxide of example 1, the second being lithium cobalt dioxide and a third type showing a surface modification, namely growth, of the original lithium nickel dioxide starting material.

EXAMPLE 11

In this example it is shown that the cycle stability of lithium nickel dioxide may be improved by the presence of aluminium in the coating.

25 g of sample 1 were mixed with an aqueous solution containing 1.875 g of Al(NO$_3$)$_3$.9H$_2$O and 0.3445 g of LiNO$_3$ to form a slurry having a mole ratio of LiNiO$_2$:Al(NO$_3$)$_3$.9H$_2$O:LiNO$_3$ of 1.0:0.02:0.02. The mixture was treated as in example 2 and the resultant product tested in the above-described cell. A reversible charge capacity of about 190 mAh/g was observed during cycling between 3.0 and 4.25 volts. However, the fade rate was lower than uncoated lithium nickel dioxide.

EXAMPLE 12

This example shows that the cobalt concentration is higher at the surface and in the thin surface layer than in the body of the cathodic material.

The nickel and cobalt ratio in the surface of sample 2 was measure by Auger analysis. Auger analyses were carried out using a Perkin-Elmer Model PHI-600™ scanning Auger microprobe. A 10 kv electron beam focused to a spot size of 1 μm was used in this examination. Sputtering was performed using a 3 kV Ar+ ion beam rastered over an area of 1×1 mm². The sputter rate under these conditions was determined to be about 27 nm/minute.

Figure 5:
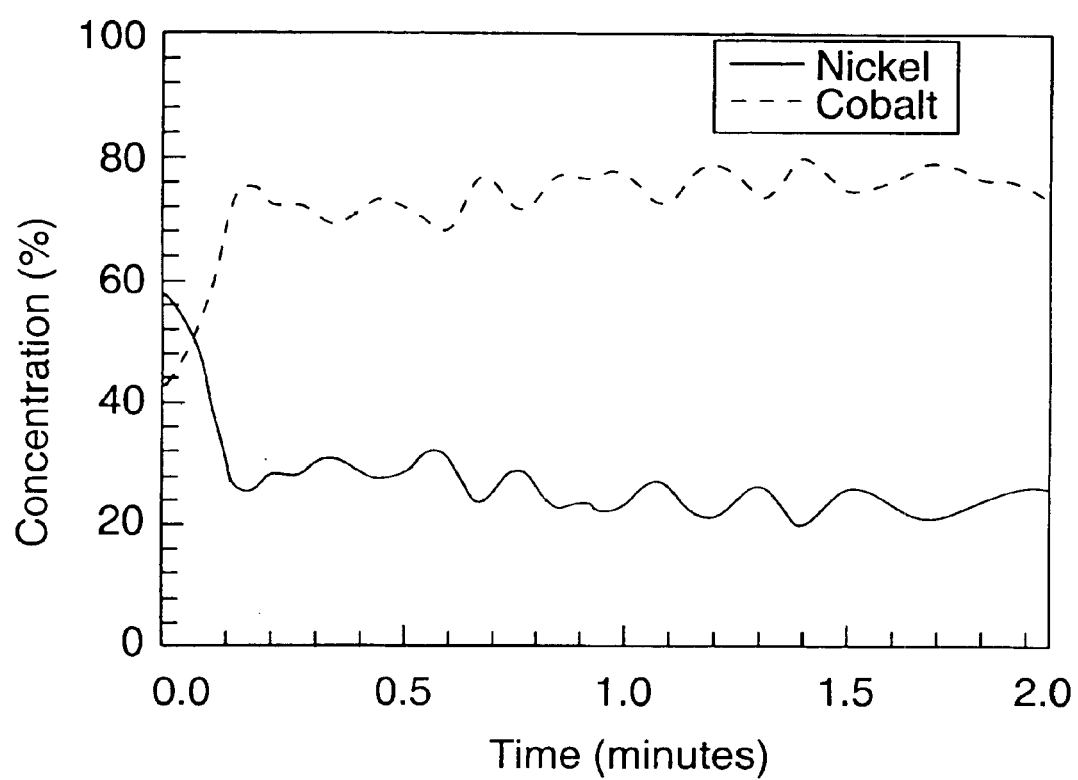
FIG. 5 is a plot of nickel and cobalt concentrations versus sputtering time.

FIG. 5 shows the nickel and cobalt concentration versus the sputtering time of one particle of sample 2 measured by the Auger depth profile. Other particles of sample 2 showed a similar nickel and cobalt concentration profile. The total nickel and cobalt is 100%. The two minute sputtering time corresponds to about 54 nm depth from the surface. Clearly, the Co:Ni ratio is about 55:45 at the surface. At a depth from the surface of about 2.7 nm (or 0.1 minute sputtering time), which is the same order of the lattice constant c, the Co:Ni ratio is about 50:50. Between the depth of 5.4 nm and 54 nm (between 0.2 minute and 2 minute), the Co:Ni ratio slowly decreased to a ratio of about 22:78. The total Co in sample 2 is about 3.3% of total Ni. Therefore cobalt concentration is significantly higher in the surface than in the bulk, especially in the thin layer of about 3 nm from the surface. The cobalt thus is mainly distributed in the surface.

It will be understood, of course, that modifications can be made in the embodiment of the invention illustrated and described herein without departing from the scope and purview of the invention as defined by the appended claims.

What is claimed is:

1. A particular cathodic material for use in a rechargeable lithium electrochemical cell wherein each particle comprises:

a lithiated transition metal oxide core functional as an intercalation cathode consisting of lithium nickel dioxide or lithium nickel cobalt dioxide having the formula $LiNi_{1-y}Co_yO_2$ wherein y>0, or a mixture thereof, and a lithium ion conductor coated on each particle of said core said conductor having electron conductive properties and being functional to stabilize said core to thereby impart predetermined electrochemical properties to said cathodic material, wherein said lithium ion conductor is $LiCo_xNi_{1-x}O_2$ having a thickness between about 0.5 nm and about 5000 nm, and wherein x>y+0.1 for y<0.9, and x>0.1 for lithium nickel dioxide as a core.

2. The cathodic material as set forth in claim 1 wherein said lithium ion conductor is $LiCo_xNi_{1-x}O_2$ having a thickness between about 1 nm and about 500 nm and x>0.1 for y<0.9, and x>0.1 for lithium nickel dioxide as a core.

3. A particulate cathodic material for use in a rechargeable lithium electrochemical cell wherein each particle comprises:

a lithiated transition metal oxide core functional as an intercalation cathode consisting of lithium nickel dioxide or lithium nickel cobalt dioxide having the formula $LiNi_{1-y}Co_yO_2$ wherein y>0, or a mixture thereof, and a lithium ion conductor coated on each particle of said core, said conductor having electron conductive properties and being functional in stabilize said core to thereby impart predetermined electrochemical properties to said cathodic material, wherein said lithium ion conductor is $LiCo_xNi_{1-x}O_2$ and wherein x>0 and x>y.

* * * * *